(12) United States Patent
Haile

(10) Patent No.: US 9,707,537 B2
(45) Date of Patent: Jul. 18, 2017

(54) DEVICES AND METHODS FOR CURING NAIL GELS

(71) Applicant: Nail Alliance, LLC, Gladstone, MO (US)

(72) Inventor: Danny Lee Haile, La Habra, CA (US)

(73) Assignee: Nail Alliance, LLC, Gladstone, MO (US)

( * ) Notice: Subject to any disclaimer, the term of this patent is extended or adjusted under 35 U.S.C. 154(b) by 0 days.

(21) Appl. No.: 14/184,027

(22) Filed: Feb. 19, 2014

(65) Prior Publication Data

US 2014/0166901 A1    Jun. 19, 2014

Related U.S. Application Data

(63) Continuation of application No. 13/334,500, filed on Dec. 22, 2011, now abandoned.

(51) Int. Cl.
*A45D 29/00* (2006.01)
*B01J 19/12* (2006.01)

(52) U.S. Cl.
CPC ............ *B01J 19/123* (2013.01); *A45D 29/00* (2013.01)

(58) Field of Classification Search
CPC .. B01J 19/123; A45D 29/00; A45D 2200/205; F26B 3/28; F26B 9/003; A61Q 3/02; G21K 5/08
USPC ................. 250/515.1, 504 R, 504 H; 132/73; 118/620; 34/275; D28/58
See application file for complete search history.

(56) References Cited

U.S. PATENT DOCUMENTS

| | | | |
|---|---|---|---|
| 3,258,853 A * | 7/1966 | Bradbury | A45D 29/18 132/73.5 |
| 3,287,824 A | 11/1966 | Selditz | |
| D277,323 S * | 1/1985 | Raicevic | D28/58 |
| 4,979,523 A | 12/1990 | Grimm | |
| 5,084,984 A | 2/1992 | Duchoud et al. | |
| 5,130,553 A | 7/1992 | Amoh | |
| 5,249,367 A | 10/1993 | Nafziger et al. | |
| 5,516,509 A * | 5/1996 | Marr-Leisy | A61K 8/35 424/61 |
| 6,035,548 A * | 3/2000 | Rae | F21V 7/22 101/424.1 |
| 6,035,860 A | 3/2000 | Mombourquette | |
| 6,391,938 B1 | 5/2002 | Lilley | |
| 6,599,958 B2 | 7/2003 | Lilley | |

(Continued)

FOREIGN PATENT DOCUMENTS

JP    64-56008    3/1989
WO    2005120286 A1    12/2005

(Continued)

OTHER PUBLICATIONS

"Polish Pro" Dec. 2010, downloaded from http://www.nsinails.co.uk/media/polish_pro_download.pdf.*

(Continued)

*Primary Examiner* — Wyatt Stoffa
(74) *Attorney, Agent, or Firm* — Polsinelli PC

(57) ABSTRACT

Novel nail gel curing devices and methods of their use are disclosed. Novel shields for nail gel curing devices and methods of their use are also disclosed. The devices and shields are useful for curing nail gels and more particularly where light emitting diode "LED" equipped devices are used to cure UV-VIS curable nail gel resins.

3 Claims, 9 Drawing Sheets

(56) References Cited

U.S. PATENT DOCUMENTS

| | | |
|---|---|---|
| 6,647,988 B2 | 11/2003 | Christianson |
| 6,708,697 B1 | 3/2004 | Ziff |
| 6,762,425 B1 | 7/2004 | Strait |
| 6,803,394 B2 | 10/2004 | Lilley et al. |
| 7,100,620 B2 | 9/2006 | Fung |
| 7,712,473 B1 | 5/2010 | Robinson et al. |
| 7,804,074 B2 | 9/2010 | Bernecker |
| D661,021 S * | 5/2012 | Chang .................. D28/54.1 |
| 8,242,475 B1 * | 8/2012 | Cheng .................. A45D 31/00 118/620 |
| 8,739,431 B2 * | 6/2014 | Cheng .................. A45D 29/00 132/73 |
| 2010/0067227 A1 * | 3/2010 | Budike .................. F21K 9/00 362/235 |
| 2011/0036997 A1 * | 2/2011 | Lai .................. A45D 29/00 250/492.1 |
| 2011/0277338 A1 * | 11/2011 | Li .................. F26B 3/28 34/275 |
| 2012/0060757 A1 * | 3/2012 | Li .................. F26B 3/28 118/620 |
| 2012/0187311 A1 * | 7/2012 | Vu .................. A45D 29/00 250/492.1 |
| 2013/0112894 A1 * | 5/2013 | Cheng .................. A45D 29/00 250/455.11 |

FOREIGN PATENT DOCUMENTS

| | | |
|---|---|---|
| WO | 2007059813 A1 | 5/2007 |
| WO | WO 2011/011304 | 1/2011 |

OTHER PUBLICATIONS

"Wholesale—digital nail uv lamp, nail uv lamp, manicure machine, with sensor;" http://http://www.dhgate.com/digital-nail-uv-lamp-nail-uv-lamp-manicure/p-ff808081309784620130ac1819482c57.html.

* cited by examiner

DEVICES AND METHODS FOR CURING NAIL GELS

CROSS REFERENCE TO RELATED APPLICATIONS

The present application is a continuation of U.S. application Ser. No. 13/334,500, filed Dec. 22, 2011, now abandoned, the disclosure of which is hereby incorporated herein by reference in its entirety.

BACKGROUND OF THE INVENTION

Embodiments of the subject matter disclosed herein generally relate to devices and methods for curing nail gels and more particularly to light emitting diode "LED" equipped devices that may reduce overall curing time, generate less heat, be easier or less expensive to operate or maintain, or may reduce the level of extraneous secondary UV light to which a user is exposed outside the confines of the fingernail gel curing device.

Consumers use nail coatings to cosmetically enhance the appearance of their nails or protect the nails from the abuses found in their everyday environment. However, nail coating compositions typically lack the durability desired by consumers or are difficult to apply or remove in terms of time or effort. The lack of durability is often evidenced by a chipping or peeling of the coating soon after the original coating has been applied, requiring at least in part a reapplication of the coating in an attempt to recreate the aesthetic appearance or the therapeutic benefits of the original nail coating.

Traditional nail coatings generally include two varieties: polish type, which cure by solvent evaporation, and polymer type, which cure by chemical reaction. Polymer type materials include, for example, powder/liquid systems and gel systems.

Gel systems, in contrast to the traditional polish and other polymer-type systems, particularly ultraviolet-cured gel systems, often comprise a gel that may be brushed onto the nails, cured, and shaped to create lifelike artificial nails. As compared with traditional polishes or other non-gel polymer-type systems, gel systems are relatively easy to use, are applicable in less time, are lightweight on the nail, have no odor (or only minimal odor), are durable, and have a high quality shine.

While thicker nail coatings may in general be more desirable due to their richer color or greater durability of the finished nail coating, it can be challenging to reasonably rapidly and substantially cure the entirety of the coating after its application. This is especially true for thicker or more highly pigmented UV-curable gel-based nail coating systems. This may be due, in part, to the nature of these coatings. For example, while UV light may readily penetrate the outermost regions of the coating composition to initiate the cure, the higher levels or darker hues of certain pigments in some coating compositions may limit penetration of the UV radiation into the innermost regions of the applied gel coating composition and thus increase the time required to substantially cure the entirety of the coating.

Often there is also a trade off in the choice of nail coatings between a particular coating's durability and its ease of removal. For example, some prior art gel coating compositions, while durable, cannot be readily removed by typical "soak-off" procedures and require a more laborious removal process. Alternatively, while some prior art gel coating compositions are very easily removed; those properties may lead to premature chipping or peeling of the coating, requiring additional maintenance or reapplication to stabilize the coating's overall appearance.

Lilley (U.S. Pat. Nos. 6,391,938, 6,803,394 and 6,599,958) discloses certain light cured nail coatings that are applied to natural nails or artificial nail tips for cosmetic purposes and methods of their use, the disclosure of which is hereby incorporated herein by reference, in its entirety.

Haile (PCT published Application WO 2011/011304 A2) discloses certain radiation curable gel nail coating compositions, kits comprising such compositions and their methods of use, the disclosure of which is hereby incorporated herein by reference, in its entirety.

U.S. Pat. No. 5,130,553 discloses a device for forming artificial nails by curing a jelly-like visible light-curable resin. The device reportedly employs fluorescent lamps to cure a gel thinly applied to fingernails.

U.S. Pat. No. 7,712,473 discloses a fingernail gel curation device that allows an individual to rapidly cure and dry fingernail gel that has been applied to their fingertips, thereby saving time for individuals and preventing unnecessary ultraviolet light exposure.

U.S. Pat. No. 4,979,523 discloses a device employing a radiation source of essentially horseshoe shape placed within a housing that reportedly provides for essentially uniform ultraviolet (UV) irradiation of all the nails of all the fingers of a hand of a user.

U.S. Pat. No. 5,249,367 discloses a nail drying device including a housing having lower and upper adjustable portions and including an ultraviolet light source enclosed therein.

U.S. Pat. No. 6,708,697 discloses a self-enclosed workstation box having side access ports with built-in sleeve guards, a removable viewing shield, a storage bin inside of the box with a holder on the bin cover for storing and supporting supplies thereon. Reportedly, the viewing shield can be hinged to the box for allowing access to the entire interior of the box.

In U.S. Pat. No. 6,762,425, Strait discloses a portable device for curing gel nail preparations utilizing UV light to cure gel nail preparations as applied to finger and toe nails. Strait notes that the device can be used to treat one or both hands or one or both feet with no changes or adjustments required.

U.S. Pat. No. 7,804,074 discloses a lightray treatment device, whose lightray treatment chamber reportedly can be accessed by the left, as well as the right hand, without a change in the position of the lightray treatment device or a change in the posture of the body of the user being required.

US Published Patent Application No. 20110036997 discloses a device containing an ultraviolet (UV) light source, which generates UV radiation by LED in lieu of a UV lamp, for curing nail gels. The design is said to improve the efficiency of the device.

A wide range of devices for curing photo-curable nail finishes are known in the art. In some cases, these devices suffer from the buildup of heat that is co-generated by the lamps used to cure the nail finishes. If not removed, the heat may lead to improper or incomplete curing of the finish or discomfort to the consumer. In other cases, the light source utilized or its light distribution is inefficient leading to long curing times with concomitant radiation overexposure to hands or feet, or incomplete nail finish curing. Other known devices fail to shield the consumer from radiation that may escape the device. Still other devices employ radiation sources that require maintenance or exchange on a short time cycle to perform satisfactorily. Yet other designs are cumbersome, costly to manufacture, or require the consumer to maintain uncomfortable positions during the curing operation. In certain other devices, access to the working surfaces of the unit for, inter alia, general cleaning or hygienic operation is limited by the design itself.

What is needed are devices that efficiently cure photo-curable nail gels or nail gel systems without buildup of significant heat while employing radiation sources that rapidly and substantially cure the gels without unnecessarily irradiating the consumer's hands or feet. Devices are also needed that are cost effective in use or require less maintenance than prior art systems, especially those that are inexpensive to manufacture, easier to clean, have a smaller footprint, or are portable in design. Still other devices are needed that substantially shield the consumer from radiation that escapes the confines of the device during the curing operation. The subject matter disclosed herein is directed to these and other important ends.

SUMMARY OF THE INVENTION

In accordance with an embodiment, the subject matter disclosed herein is directed, in part, to novel devices for curing photo-curable nail gels that have been applied to a fingernail or toenail, and methods of their use. In particular, the subject matter herein disclosed is directed to fingernail (or toenail) gel curing devices having a substantially non-UV transmitting shield slidably attached thereto for reducing or otherwise substantially inhibiting the escape of UV light emitted by the LEDs from the devices to control or limit the level of extraneous secondary UV light to which a user is exposed, said secondary exposure occurring outside the confines of the fingernail gel curing or drying device. In certain embodiments, the device employs a plurality of LEDs substantially uniformly disposed about the top and sides of an inner chamber or dome to more uniformly distribute and utilize the ultraviolet light for curing of all five nails of a hand or foot in a relatively shorter period of time as compared to prior art devices. The plurality of LEDs may include any number of LEDs such as 5, 6, 7, 8, 9, 10, 11, 12, 13, 14, 15, 16, 17, 18, 19, 20, or more. The LEDs employed in the devices are selected on their ability to emit radiation within the ultraviolet-visible light range "UV-VIS spectrum" and to cure the photo-curable gel. The durability of LEDs minimizes the need to replace bulbs or radiation sources throughout the lifetime of the devices. The LEDs typically provide from about 2 to about 5 watts of power per LED, which permits facile curing while minimizing a user's overexposure to primary irradiation as well as reducing heat generation in the device, thus providing a level of comfort and safety for the consumer. Generally speaking, it is advantageous to elect a wattage of LED such that the total wattage number of LEDs times watts per LED is in the range of about 20 to about 40 watts, preferably from about 30 to about 36 watts, at least in part dependent on the device selected. The LEDs may employ reflectors to focus their light efficiently at the targeted nails. This can be carried out advantageously, for example, thorough the use of diamond or other faceted reflectors.

In certain embodiments, the device is ergonomically designed for client comfort. In other embodiments, the device has a tray that is readily removable to allow sanitizing of the irradiation chamber or tray. The tray may be attached in any suitable way that allows its ready removal. For example, it may be attached to the lower portion of the device, such as to the base or lower edge of the outer housing. When attached, the tray is positioned substantially in a plane parallel to the plane of the base of the device. In some instances, a series of magnets may be employed to hold the tray in place until its removal is desired for cleaning or other maintenance purposes. In instances where magnets are employed, their location is not critical as long as they do not interfere with either curing or tray removal. In some embodiments, the magnets are associated with the removable tray. In other embodiments, the magnets are associated with the base or outer housing.

In yet other embodiments, the device includes one or more timing devices to set the time for curing. These timers may be preset for specific durations of time between about 1 second and about 120 seconds, for example, 5, 10, 20, or 30 seconds. This allows an operator to choose a set curing time for curing the nail gel by pushing a button rather than by manually programing the timer. The timers may also include a countdown function to assist the operator in using the device. In still other embodiments, the device incorporates a computerized hand-sensor such as a motion detector, to automatically initiate irradiation by the LEDs for the correct preset time whenever a hand or foot is placed into the irradiation chamber. In certain embodiments, the device may also be equipped with a stand to allow an alternative position for a thumb while the other four digits on a hand are being irradiated. Due to the nature of the nail coating process, it is useful that the elements of the device be solvent resistant to common nail polish/nail gel solvents including acetone.

In other embodiments, the subject matter disclosed herein is directed, in part to a non-UV transmitting shield that may be attached to a fingernail or (toenail) gel curing device employing LEDs to cure the nail gel. The manner of the shield's attachment allows the shield to be repositioned by sliding from one position to another. The shield is attached in proximity to the opening to the irradiation chamber. In the full open position, the shield does not affect the size of the irradiation chamber opening. The shield may be slid in such a way as to reduce the size of the opening (i.e., a more closed position). The distance that the shield may travel in preparation for nail curing is only limited by the hand or foot placed in the curing nail gel curing device. In this manner, the shield may be employed to reduce the level of extraneous secondary UV light to which a user is exposed. As used herein the term "secondary UV light", refers to any secondary UV exposure emitted by, but occurring outside the confines of, the fingernail gel curing device. The shield is typically placed on or near the outside surface of the device housing to which it is attached to maximize its secondary exposure shielding properties while minimizing any interference with any primary curing irradiation internal to the device. In an open position, the shield allows ready insertion of the hand or foot having gel coated nails into the irradiation chamber of the device to which the shield is attached and where curing takes place. After the hand or foot having freshly gelled nails is inserted into the gel curing device, the shield may be moved closer to the hand or foot by sliding it partially across the opening to reduce the size of the opening. When the shield is moved into a more closed position, the non-UV transmitting shield reduces the amount of extraneous secondary UV light to which a user is exposed, by reducing the size of the opening through which any UV light emitted within the device may escape the confines of the device, such as its irradiation chamber, for example.

The material of construction for the shield is not critical. Any solid material that may be readily shaped or molded into a shield, considered safe for contact by consumers, and that reduces or otherwise substantially inhibits the transmission of UV light emitted by the LEDs contained in the fingernail gel curing device may be used as a means of controlling the level of extraneous secondary UV light exposure occurring outside the confines of the device. The shield may be attached to a fingernail gel curing device in any number of ways so long as the shield may be opened or closed readily, and the manner of closure allows the shield's position to be adjusted to accommodate different hand or foot sizes. For example, the shield may be attached in a slidable fashion, preferably above the insertion point or opening of the hand or foot into the device, such that the shield may slide down to any extent necessary to contact the hand or foot of the consumer, to reduce the size of the opening and maximize protection against any extraneous secondary UV light exposure occurring outside the confines of a fingernail gel curing device.

It is therefore an object of the present invention to provide a fingernail gel curing device which has all of the advantages of the prior art and none of the disadvantages.

It is another object of the present invention to provide a fingernail gel curing device which may be easily and efficiently manufactured and marketed.

It is another object of the present invention to provide a fingernail gel curing device which is of durable and reliable construction.

It is yet another object of the present invention to provide a fingernail gel curing device which is economically affordable and available for relevant market segment of the purchasing public.

BRIEF DESCRIPTION OF THE DRAWINGS

FIG. 1 is a view from below the device. FIG. 2 is a view from above the device that shows a shield in the up or open position.

FIG. 7 is a view from above the device and shows a shield in the up or open position. FIG. 8 is a view from below the device with base attached.

FIG. 9 is a view from above the device. FIG. 10 is a view from below the device.

DETAILED DESCRIPTION OF THE ILLUSTRATIVE EMBODIMENTS

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout. In this document, the term "or" is used to refer to a nonexclusive or, unless otherwise indicated. Moreover, unless explicitly stated to the contrary, embodiments "comprising" or "having" an element or a plurality of elements having a particular property may include additional such elements not having that property.

As used herein, the term "slidably attached" refers to means for enabling the shield to slide in a direction that either enlarges or reduces the size of the opening to the irradiation chamber in the device that is available to the user for insertion of an attendant hand or foot requiring nail gel curing.

Figure 1:
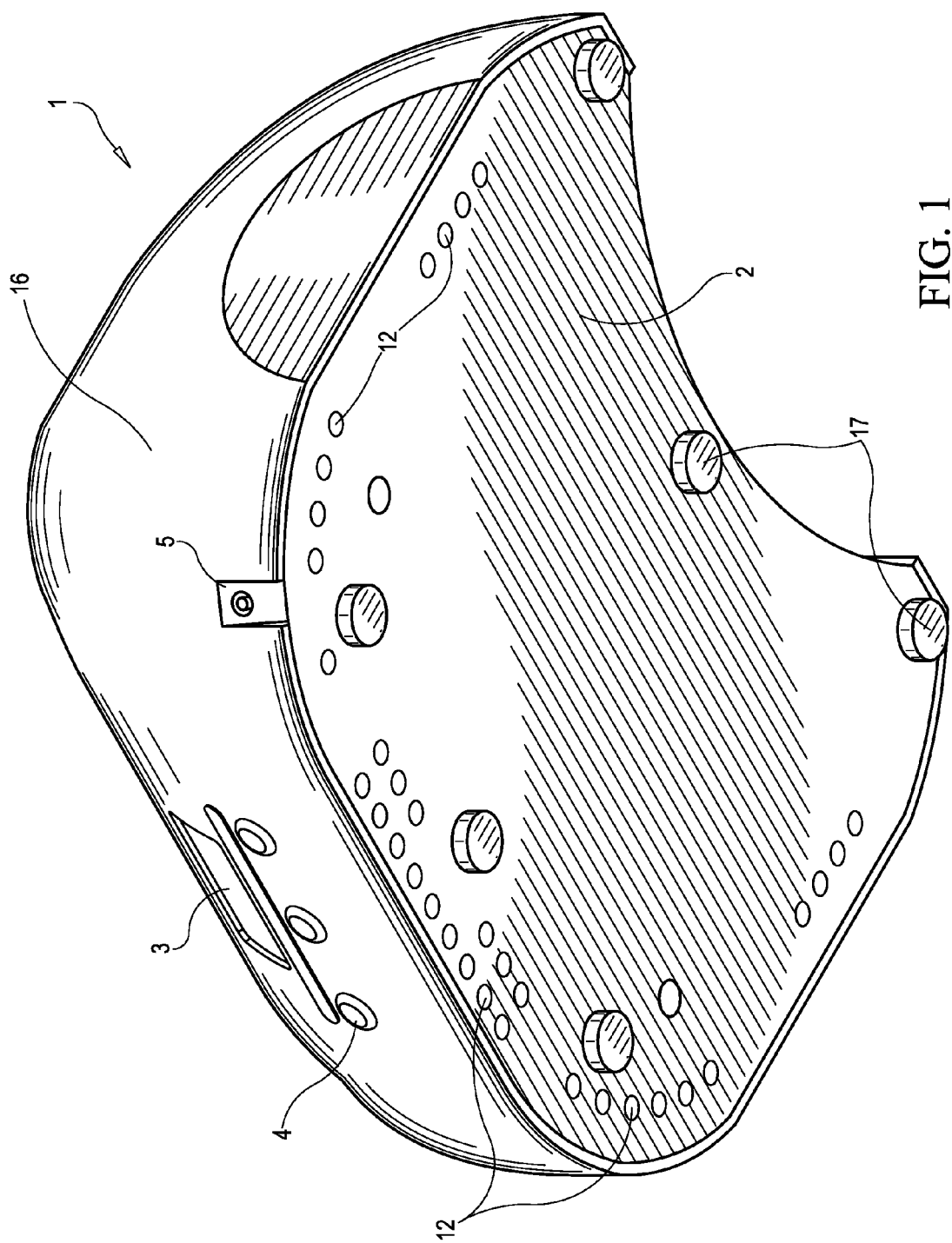
FIGS. 1 and 2 are perspective views of an exemplary embodiment of a device according to the present invention.

With reference now to the drawings, and in particular to FIGS. 1 through 6 thereof, a new fingernail gel curing device embodying the principles and concepts of the present invention and generally designated by the reference numeral 1 will be described. The device 1 comprises an outer housing 16, a base 14, and a dome 19 as shown in certain of FIGS. 1 through 6. The outer housing, base and dome are attached to one another and configured such that they define an irradiation chamber 8 within the device and below the apex of the dome. They also define a space between the outer housing 16 and the dome 19 in which the electronics, including the LEDs, timers, and power controls are located. They are attached to one another and configured such that the dome 19 and irradiation chamber 8 are within the outer housing. FIG. 1 is a perspective view taken from the back lower left of an exemplary embodiment of an LED-equipped fingernail gel curing device of the present invention having a shield 6 that reduces the level of extraneous secondary UV light to which a user is exposed outside the confines of the fingernail gel curing device. The shield is not visible if FIG. 1 but is visible in FIG. 2. In the embodiment shown in FIG. 1, a detachable tray 2 is magnetically affixed at the base of the device in a substantially horizontal manner in relation to the base. The rear of the device' outer housing has a viewing window 3 for the timer and three buttons 4 for preset times of irradiation. The device also has an electrical connection 5 for providing power to the device. The tray has a series of openings 12 that align with corresponding openings 13 in the base of the device, to which the tray is removably attached, to allow air to enter the internal space as defined by the outer housing, base and dome through the openings and exit through grillwork located in the apex of the dome. This air moving through the device enables heat generated by the LEDs or other electronics during operation to be removed from the device. The tray also has protuberances (or feet) 17 attached to its lower face to permit entry of outside air from underneath the device through the openings into the internal space of the device where the electronics are housed.

Figure 2:
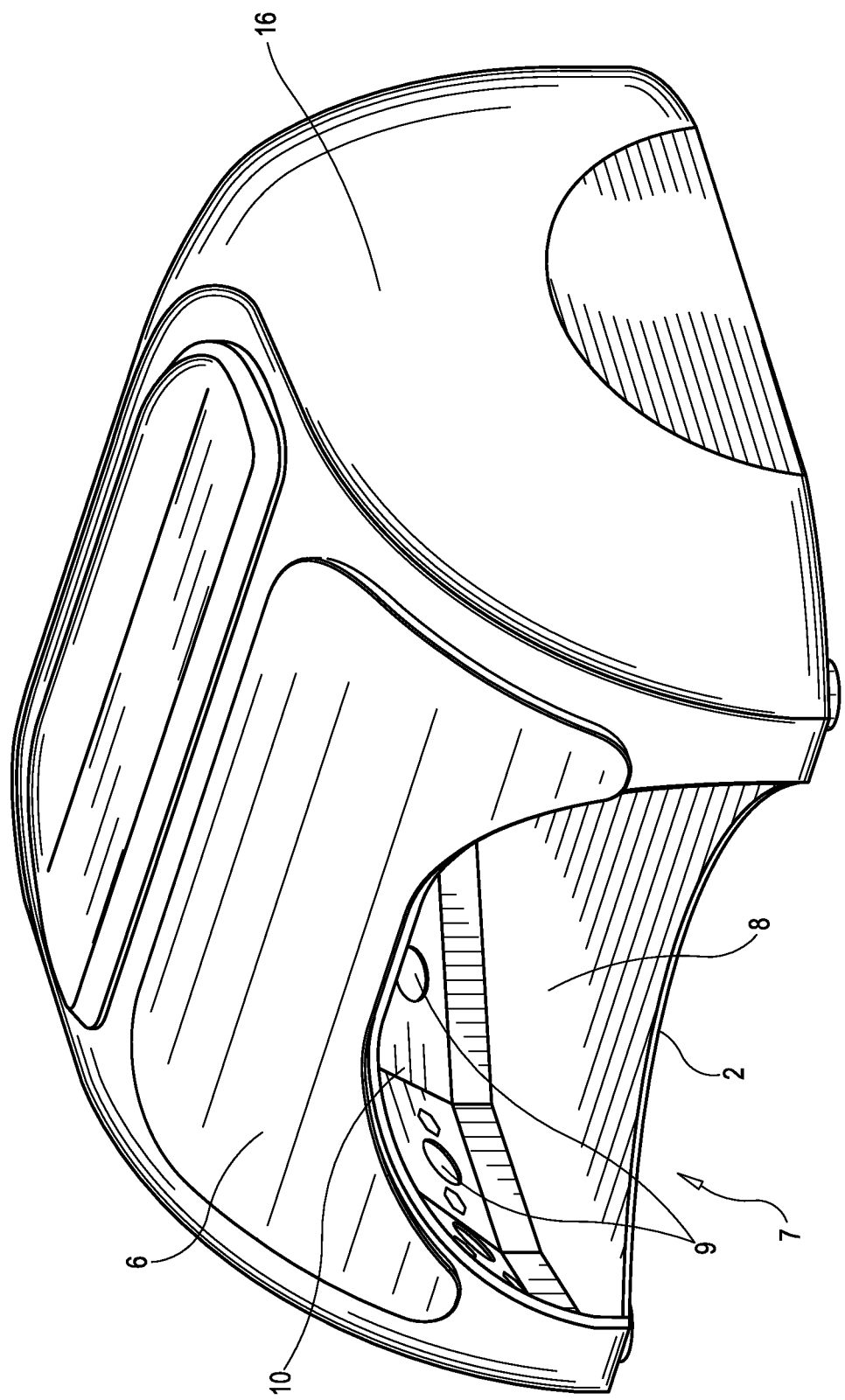

FIG. 2 is a perspective view taken from the front upper right of the exemplary embodiment shown in FIG. 1. FIG. 2 depicts a slidable shield 6 set in the open position above the opening 7 to the irradiation chamber 8 in the embodiment shown. Two LEDs 9 of a plurality of such are shown inset into the side walls 10 of the dome comprising the irradiation chamber.

Figure 3:
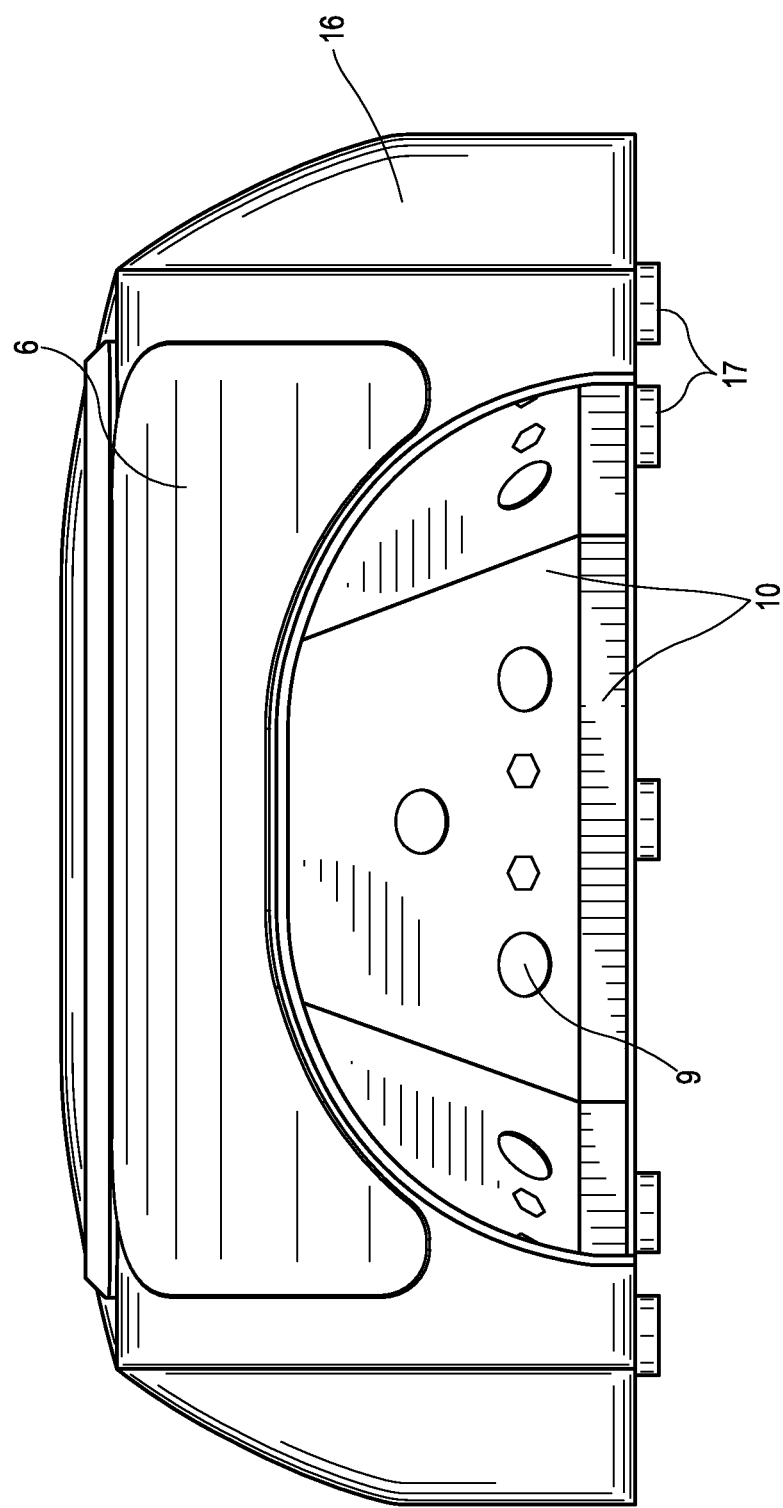
FIG. 3 is a front view of an exemplary embodiment of a device according to the present invention with a shield in the open or up position.

FIG. 3 is a frontal view of the exemplary embodiment shown in FIG. 1. FIG. 3 better illustrates aspects of the dome, the irradiation chamber side walls 10, the LEDs 9 and the shield 6 in its open position.

Figure 4:
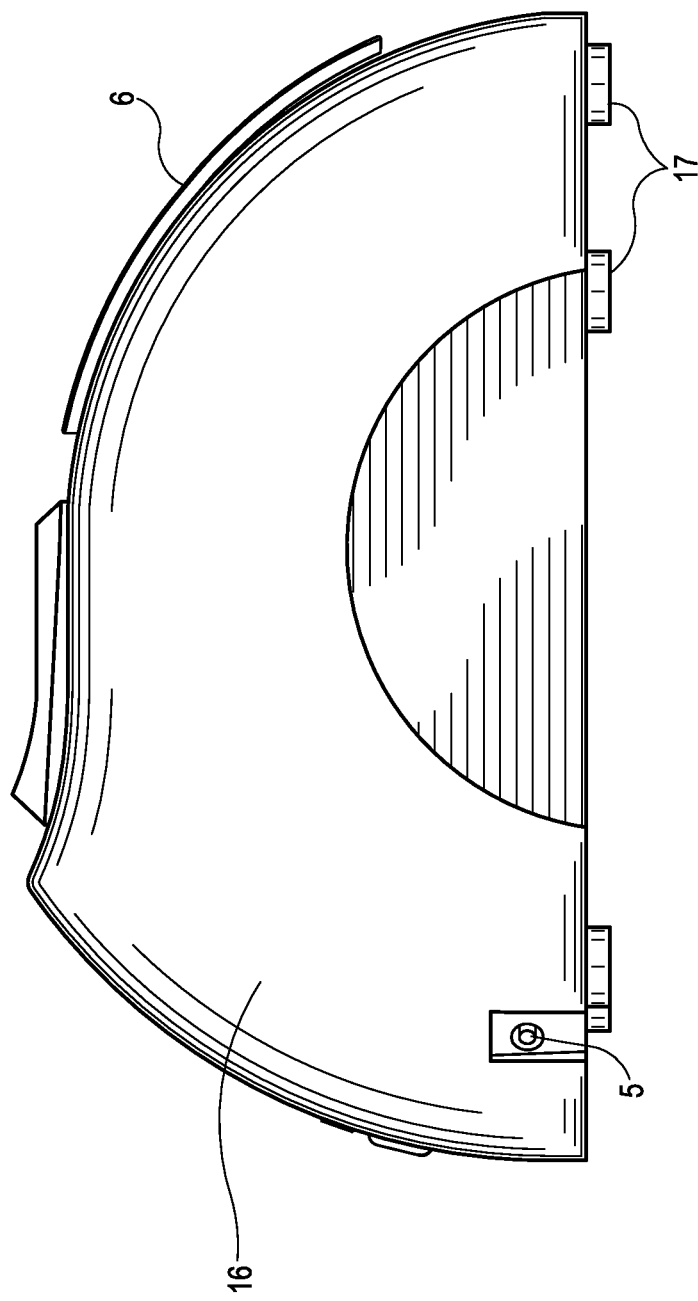
FIG. 4 is a view from above the device of an exemplary embodiment according to the present invention from the left side.

FIG. 4 is a side view taken from the left of the exemplary embodiment shown in FIG. 1. FIG. 4 illustrates the position and curvature of the shield 6 in an open position.

Figure 5:
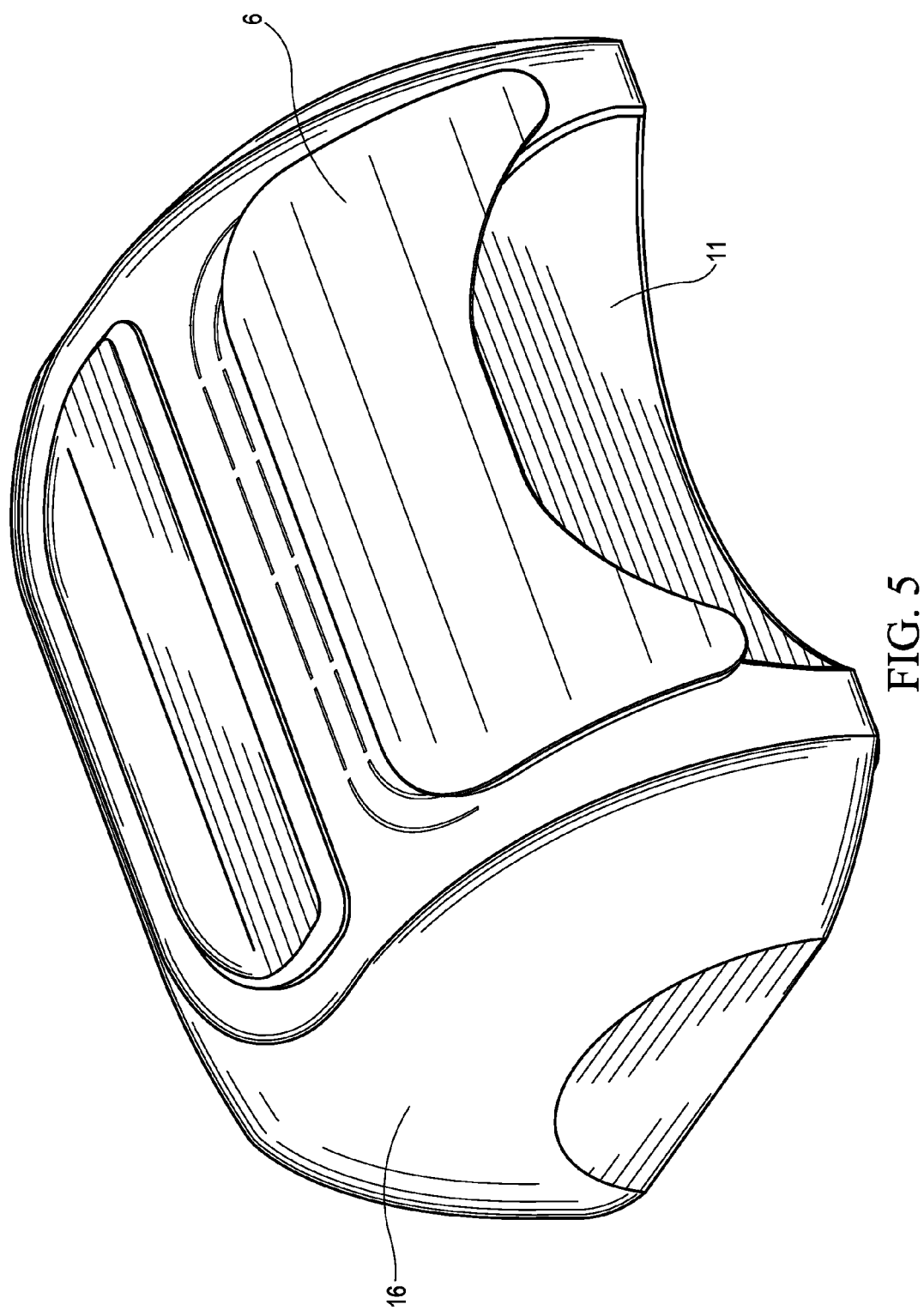
FIG. 5 is a perspective view of an exemplary embodiment of a device according to the present invention with a shield in a lowered position.

FIG. 5 is a left perspective view of the exemplary embodiment shown in FIG. 1 taken from above the device. FIG. 5 shows the shield 6 in a slidably lowered position, reducing the size of the opening 11 to the irradiation chamber relative to when the shield is in its fully open position.

Figure 6:
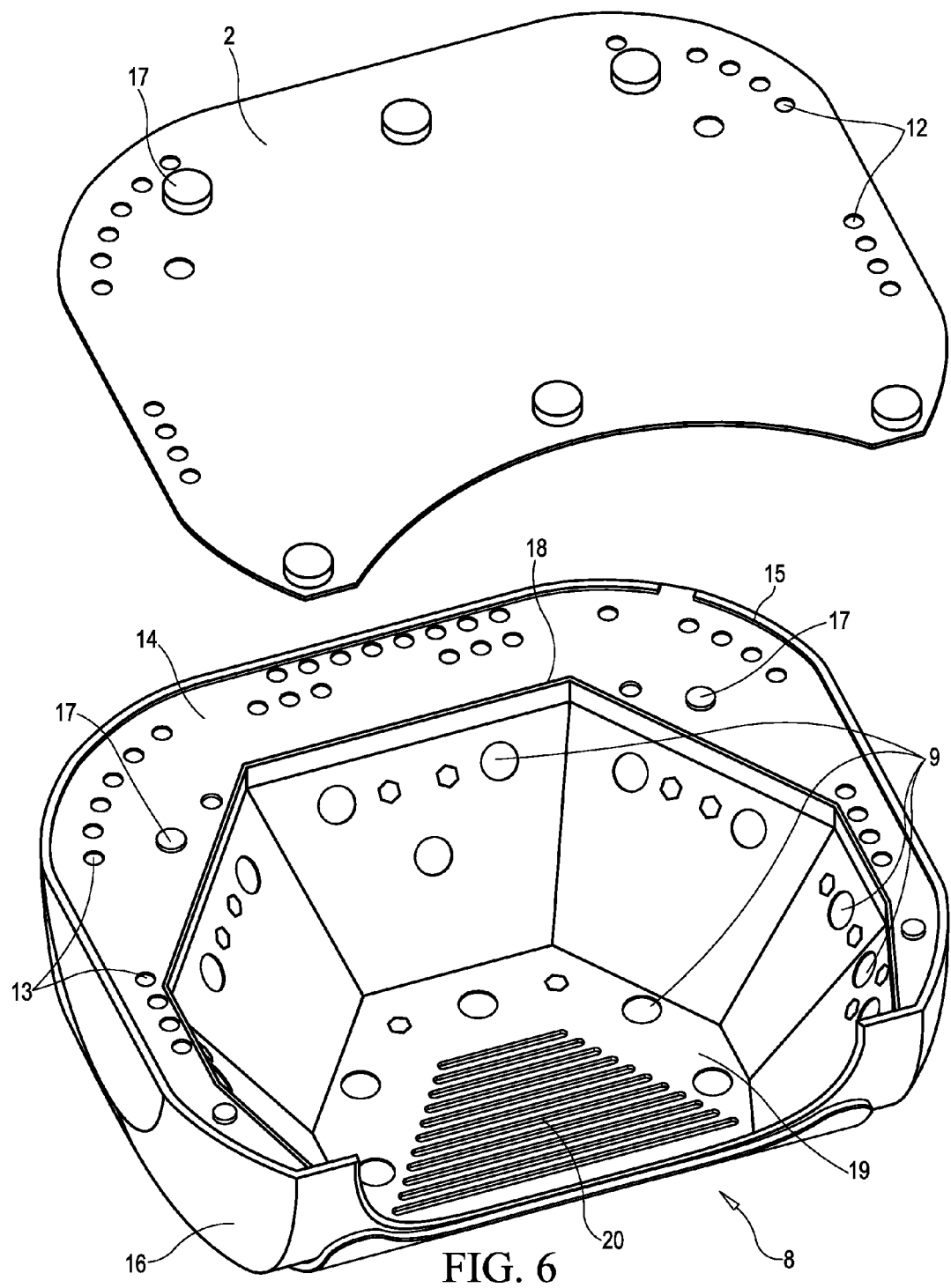
FIG. 6 is an exploded perspective view of a device turned upside down of an exemplary embodiment according to the present invention showing a detachable tray as well as a view of the embodiment's irradiation chamber.

FIG. 6 is an exploded perspective view of the exemplary embodiment shown in FIG. 1 turned upside down to allow viewing of the dome. FIG. 6 depicts a detached tray 2 with air openings 12 corresponding to the openings 13 in the device base 14, exposing the irradiation chamber 8 to visual inspection, including a view of the positions of 15 of the 18 2 W LEDs 9 employed for nail gel curing. An optional motion detector (exemplified by a two-part transmitter-receiver type) that is capable of activating the LEDs may be added with proper alignment, for example, to opposing facie of the dome.

As seen in the embodiment shown in FIG. 6, the base 14 generally conforms to a horseshoe-like shape within a plane, with its outer edges 15 attached to the outer housing 16. The shape of the base's outer edge substantially corresponds to the shape of the bottom edge of the outer housing. The base has a number of perforations 13 or openings to assist in the circulation of air through the device. The base also has a plurality of protuberances 17 on its lower face that may act as feet in situations where the tray has been removed (such as for irradiation of toenails), as well as to provide spacing between the device and any surface upon which it rests, allowing for air to enter or exit the device for cooling purposes.

The base and the dome may be prepared from a wide range of construction materials or combinations of construction materials. Suitable construction materials include those that are reflective of or do not otherwise transmit appreciable UV-VIS light, are durable, lightweight (for portability purposes), or are easily machined or molded into a desired shape. Such materials would be readily apparent to one of ordinary skill in the art, once armed with the present disclosure. It is convenient to prepare these from a metal, such as stainless steel, to take advantage of the durability of the metal, its magnetic properties and the light reflectiveness of its surface. The base and dome may be of a continuous material or prepared separately and subsequently joined together. The shape of the base's inner edge 18 substantially corresponds to the lower edges of the dome such that the dome edges can be attached to the base's inner edge, for example, by soldering or tack welding. In the embodiment shown in FIG. 6, the dome is formed from a single sheet of metal. The interior shape of the dome may be any shape that provides support for the LEDs and that reflects the UV-VIS rays sufficiently to provide curing to the nail gel. In the illustrative embodiment, the dome's apex 19 adopts the shape of a non-equilateral octagon having a longest side with the plane of the apex being generally parallel to the base of the device. The octagon-shaped apex has a plane of symmetry perpendicular to the plane of the dome's apex, the plane bisecting the longest side and the opposing side of the octagon. Extending from each of the non-longest sides of the octagon is a metal petal, each petal shaped substantially as an isosceles trapezoid with the shorter of its parallel sides adjoining one of the non-longest sides of the dome's apex octagon. The outside edge of each of the trapezoid (longer of its two parallel sides) is attached to the base at the base's inside edge, the attachment defining an acute angle between the plane of the base and each petal, such that the petals, so attached, together form the sidewalls of the irradiation chamber. The longest side of the octagon, having no trapezoid-shaped petal, generally defines the top of the opening for the device irradiation chamber.

The embodiment in FIG. 6 also shows grillwork 20 that allows air warmed by electronics' generated heat to escape the internal space in the device, the grillwork located in the apex of the dome which at least in part defines the irradiation chamber.

Figure 7:
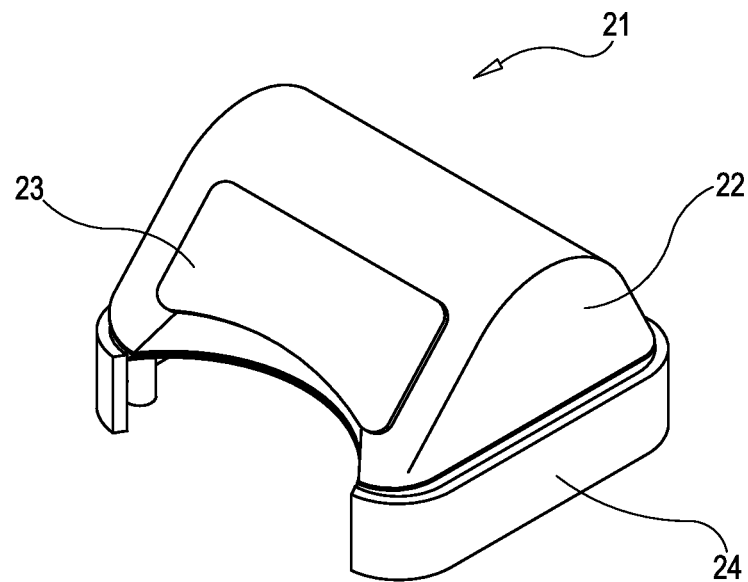
FIGS. 7 and 8 are perspective views of an alternative exemplary embodiment of a device according to the present invention.
Figure 8:
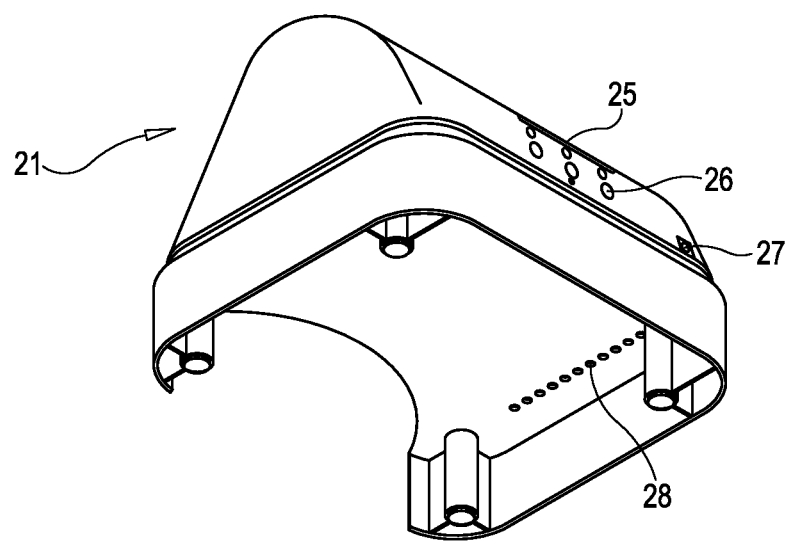

With reference now to the drawings, and in particular to FIGS. 7 through 10 thereof, a new fingernail gel curing device embodying the principles and concepts of the present invention and generally designated by the reference numeral 21 will be described. The device 21 comprises an outer housing 22, a base, and a dome 32. The dome is visible in FIG. 10. The outer housing, base and dome are attached to one another and configured such that they define an irradiation chamber within the device and below the apex of the dome. They also define a space between the outer housing and the dome in which the electronics, including the LEDs, timers, and power controls are located. FIG. 7 is a perspective view taken from the front upper right of an exemplary embodiment of an LED-equipped fingernail gel curing device of the present invention having a shield 23 that reduces the level of extraneous secondary UV light exposure to which a user is exposed outside the confines of the fingernail gel curing device. The device has an optional stand 24. FIG. 8 is a perspective view taken from the back lower right of an exemplary embodiment of an LED-equipped fingernail gel curing device of the present invention. The rear of the device' outer housing has a viewing window 25 for the timer and three buttons 26 for preset times of irradiation. The device also has an electrical connection 27 for providing power to the device. In FIG. 8, the base of the device is resting on an optional stand. A detachable tray 30 (see FIG. 9) is magnetically and removably affixed to the base of the device in a substantially horizontal manner in relation to the base. The tray is interposed between the base 34 of the device and the optional stand 24. The tray and the stand have a series of matched openings 28 that align with corresponding openings 28 in the base of the device to allow air to enter or exit the internal space as defined by the outer housing, base and dome through the openings. This air moving through the device enables heat generated by the LEDs or other electronics during operation to be removed from the device.

Figure 9:
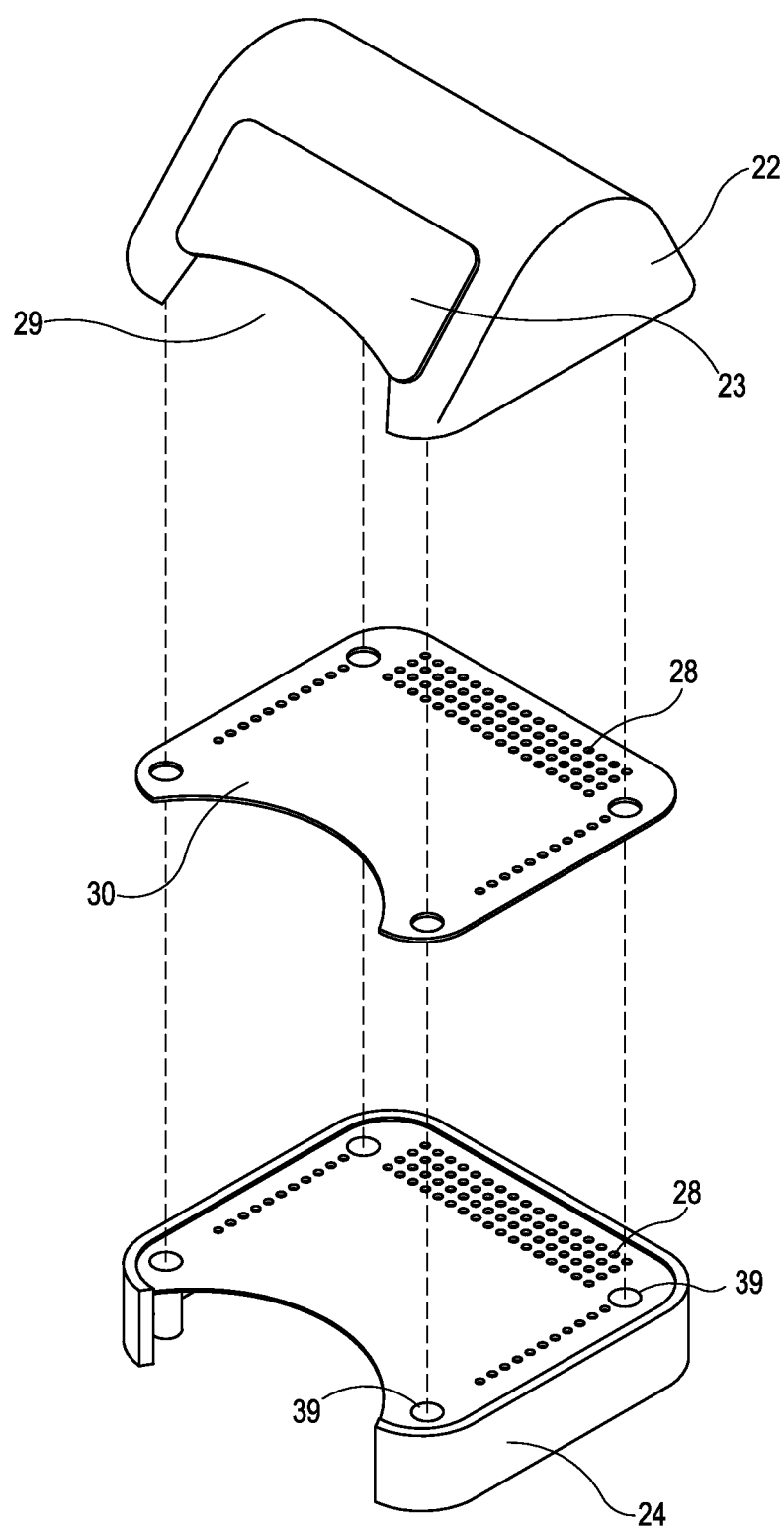
FIGS. 9 and 10 provide exploded perspective views of the alternative exemplary embodiment from FIG. 7 of a device according to the present invention showing a detachable tray and the associated stand, as well as a view of the embodiment's irradiation chamber.

FIG. 9 is a exploded perspective view taken from the front upper right of the exemplary embodiment shown in FIG. 7. FIG. 9 depicts a slidable shield 23 set in the open position above the opening 29 to the irradiation chamber 32. In FIG. 9, a detachable tray 30, with openings 28 for air circulation assistance, is magnetically affixed at the base of the device in a substantially horizontal manner in relation to the base. The optional stand 24 is also depicted.

Figure 10:
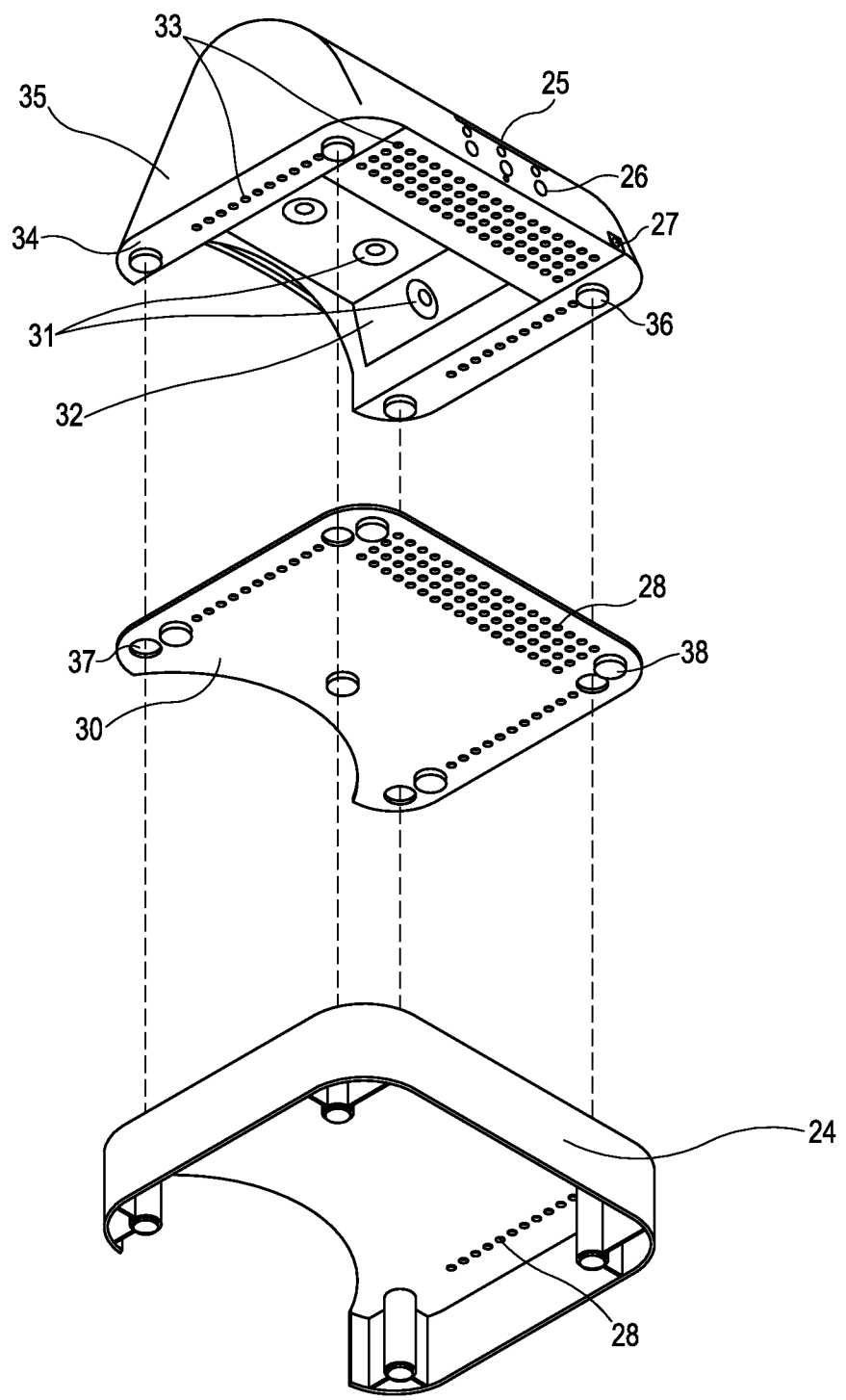

FIG. 10 is an exploded perspective view of the exemplary embodiment shown in FIG. 7 taken from below the device. FIG. 10 further depicts a detached tray 30 with air openings 28 corresponding to the openings 33 in the device base, exposing the irradiation chamber 32 to visual inspection, including three LEDs 31 of a plurality of such shown inset into the irradiation chamber's dome 32 comprising the irradiation chamber.

As seen in the embodiment shown in FIG. 10, the base 34 generally conforms to a horseshoe-like shape within a plane, with its outer edges attached to the outer housing 35. The shape of the base's outer edge substantially corresponds to the shape of the bottom edge of the outer housing. The base has a number of perforations 33 or openings to assist in the circulation of air through the device. The base also has a plurality of protuberances 36 formed on or attached to its lower face that may act as feet in situations where the tray has been removed (such as for irradiation of toenails), as well as to provide spacing between the device and any surface upon which it rests, allowing for air to enter or exit the device for cooling purposes, such as may be need for example to moderate heat generation by the enclosed electronics. These protuberances are aligned with similarly sized openings 37 in the tray to assist in the alignment of the base and tray. The tray also has plurality of protuberances 38 formed on or attached to its lower face that may act as feet in situations where the optional stand is not present, as well as to provide spacing between the device and any surface upon which it rests, allowing for air to enter or exit the device for cooling purposes. The protuberances in the base are also aligned with similarly sized insets in the optional stand 24 to assist with the alignment of the base to the stand when the tray is not in use, including the alignment of the ventilation openings of the base and stand.

When ranges are used herein for physical properties, such as LED wattage, or for numbers of elements comprising the device, all combinations and subcombinations of properties and numbers of elements therein are intended to be included.

When any variable occurs more than one time in any device, component or in any method, its definition in each occurrence is independent of its definition at every other occurrence. Combinations of variables are permissible only if such combinations result in functioning devices or functional methods.

The disclosures of each patent, patent application and publication cited or described in the application are hereby incorporated herein by reference, in their entirety.

Those skilled in the art will appreciate that numerous changes and modifications can be made to the preferred embodiments of the subject matter disclosed herein and that such changes and modifications can be made without departing from the spirit of the subject matter disclosed herein.

It is to be understood that the above description is intended to be illustrative, and not restrictive. For example, the above-described embodiments or aspects thereof may be used in combination with each other. In addition, many modifications may be made to adapt a particular situation or material to the teachings of the invention without departing from its scope.

What is claimed:

1. A nail gel curing device, comprising:
an outer housing, a base, a dome having an apex, and a magnetically-affixed, detachable tray,
   said dome comprising a plurality of light emitting diodes for curing nails positioned in the irradiation chamber;
   said housing, base, dome and tray defining:
      an irradiation chamber,
      an opening to said chamber for inserting a hand or foot having one or more gel-coated nails; and
      a space between the dome and housing sufficient to accommodate electronic or electric circuitry to operate the plurality of light emitting diodes in the curing device,
   said detachable tray attached to the base or a lower edge of the outer housing;
   said irradiation chamber being suitable for insertion of a hand, said hand having gel coated nails, said irradiation chamber capable of curing all five gel-coated nails of a hand; and
   said irradiation chamber being suitable for insertion of a foot, said foot having gel coated nails, said irradiation chamber capable of curing all five gel-coated nails of a foot;
electronic or electric circuitry to operate the plurality of light emitting diodes in the curing device;
a shield slidably attached to the device;
   said shield being capable of slidably modifying the opening's size, said modifying sufficient to modify secondary exposure to UV light exiting the confines of the device;
a viewing window for a timer, said window located on a rear portion of the housing; and
three buttons for preset times of irradiation, said buttons located on a rear portion of the housing, said preset times are each independently for durations of time from about 1 to about 120 seconds, wherein one or more of said preset times are independently selected from 1, 5, 20, 30, and 120 seconds;
wherein: said plurality of light emitting diodes are substantially uniformly disposed about the top and sides of the dome, each light emitting diode providing from about 2 to about 5 watts of power, the plurality of light emitting diodes providing a total wattage in a range of from about 20 to about 40 watts, and the light emitting diodes employing reflectors;
   AC or battery power is supplied to operate the device;
   said shield is positioned on or near an exterior surface of said outer housing, is in proximity to said opening to the irradiation chamber, and is attached above the opening to the irradiation chamber;
   said base defining a plurality of openings configured to allow air to enter said space;
   said tray defining a first plurality of openings, said first plurality of tray openings configured to communicate with said base openings;
   said dome further comprising grillwork configured to exchange heat in said space or irradiation chamber;
   said device including a motion detector to automatically initiate irradiation by the light emitting diodes when the hand or foot is inserted into the irradiation chamber;

said tray further comprising a magnetic material having protuberances or feet attached to a lower face of the tray;

said base further comprising a plurality of protuberances on a lower face of the base and a magnet;

said tray further defining a second plurality of openings, said second plurality of openings configured to align with said plurality of protuberances on the lower face of the base;

said plurality of light emitting diodes including 18 light emitting diodes; said dome being formed from a single sheet of stainless steel and having a light reflective surface; and said apex of said dome adopting the shape of a substantially planar non-equilateral octagon having a longest side, with the plane of the apex being generally parallel to the base of the device, said apex having a plane of symmetry perpendicular to the plane of said apex, the plane bisecting the longest side and an opposing side of the octagon, a metal petal extending from each of the non-longest sides of the octagon, each petal shaped substantially as an isosceles trapezoid with the shorter of its parallel sides adjoining one of the non-longest sides of the dome's apex octagon, each trapezoid's longer parallel side being attached to an inside edge of said base, the attachment defining an acute angle between a plane of the base and each petal, such that each petal, so attached, forms a sidewall of the irradiation chamber.

2. A nail gel curing device, comprising:

an outer housing, a base, a dome having an apex, and a magnetically-affixed, detachable tray, said dome comprising a plurality of light emitting diodes for curing nails positioned in the irradiation chamber;

said housing, base, dome and tray defining:
an irradiation chamber,
an opening to said chamber for inserting a hand or foot having one or more gel-coated nails; and
a space between the dome and housing sufficient to accommodate electronic or electric circuitry to operate the plurality of light emitting diodes in the curing device,
said detachable tray attached to the base or a lower edge of the outer housing;
said irradiation chamber being suitable for insertion of a hand, said hand having gel coated nails, said irradiation chamber capable of curing all five gel-coated nails of a hand; and
said irradiation chamber being suitable for insertion of a foot, said foot having gel coated nails, said irradiation chamber capable of curing all five gel-coated nails of a foot;
electronic or electric circuitry to operate the plurality of light emitting diodes in the curing device;
a shield slidably attached to the device;
said shield being capable of slidably modifying the opening's size, said modifying sufficient to modify secondary exposure to UV light exiting the confines of the device;
a viewing window for a timer, said window located on a rear portion of the housing; and
three buttons for preset times of irradiation, said buttons located on said rear portion of the housing, said preset times are each independently for durations of time from about 1 to about 120 seconds, wherein one or more of said preset times are independently selected from 1, 5, 20, 30, and 120 seconds;

wherein:
said device lacks a stand upon which the device may rest, said stand defining a chamber providing an alternative position for a thumb while the other four digits on a hand are being irradiated in the irradiation chamber;
wherein the stand has a series of openings that align with corresponding openings in the base of the device to allow air to enter or exit the internal space as defined by the outer housing, base and dome through the openings;
said plurality of light emitting diodes are substantially uniformly disposed about the top and sides of the dome, each light emitting diode providing from about 2 to about 5 watts of power, the plurality of light emitting diodes providing a total wattage in a range of from about 30 to about 36 watts, and the light emitting diodes employing reflectors;
AC power is supplied to operate the device;
said shield is positioned on or near an exterior surface of said outer housing, is in proximity to said opening to the irradiation chamber, and is attached above the opening to the irradiation chamber;
said base defining a plurality of openings configured to allow air to enter said space;
said base further comprising a plurality of protuberances on a lower face of the base and a magnet;
said tray further comprising a magnetic metal having protuberances or feet attached to a lower face of the tray;
said tray further defining a plurality of openings, said plurality of openings configured to align with said plurality of protuberances on the lower face of the base
said plurality of light emitting diodes including 16 light emitting diodes; and
said dome being formed from a single sheet of stainless steel and having a light reflective surface.

3. A nail gel curing device, comprising:

an outer housing, a base, a dome having an apex, and a magnetically-affixed, detachable tray,
said dome comprising a plurality of light emitting diodes for curing nails positioned in the irradiation chamber;
said housing, base, dome and tray defining:
an irradiation chamber,
an opening to said chamber for inserting a hand or foot having one or more gel-coated nails; and
a space between the dome and housing sufficient to accommodate electronic or electric circuitry to operate the plurality of light emitting diodes in the curing device,
said detachable tray attached to the base or a lower edge of the outer housing;
said irradiation chamber being suitable for insertion of a hand, said hand having gel coated nails, said irradiation chamber capable of curing all five gel-coated nails of a hand; and
said irradiation chamber being suitable for insertion of a foot, said foot having gel coated nails, said irradiation chamber capable of curing all five gel-coated nails of a foot;

electronic or electric circuitry to operate the plurality of light emitting diodes in the curing device;

a shield slidably attached to the device;
said shield being capable of slidably modifying the opening's size, said modifying sufficient to modify secondary exposure to UV light exiting the confines of the device;

a viewing window for a timer, said window located on a rear portion of the housing; and three buttons for preset times of irradiation, said buttons located on said rear portion of the housing, said preset times are each independently for durations of time from about 1 to about 120 seconds, wherein one or more of said preset times are independently selected from 1, 5, 20, 30, and 120 seconds;

wherein:
said plurality of light emitting diodes are substantially uniformly disposed about the top and sides of the dome, each light emitting diode providing from about 2 to about 5 watts of power, the plurality of light emitting diodes providing a total wattage in a range of from about 30 to about 36 watts, and the light emitting diodes employing reflectors;

AC power is supplied to operate the device;

said shield is positioned on or near an exterior surface of said outer housing, is in proximity to said opening to the irradiation chamber, and is attached above the opening to the irradiation chamber;

said base defining a plurality of openings configured to allow air to enter said space;

said tray defining a first plurality of openings, said first plurality of tray openings configured to communicate with said base openings;

said dome further comprising grillwork configured to exchange heat in said space or irradiation chamber;

said base further comprising a plurality of protuberances on a lower face of the base and a magnet;

said tray further comprising a magnetic material having protuberances or feet attached to a lower face of the tray;

said tray further defining a second plurality of openings, said second plurality of openings configured to align with said plurality of protuberances on the lower face of the base;

said plurality of light emitting diodes including 18 light emitting diodes;

said dome is formed from a single sheet of stainless steel and having a light reflective surface; and said apex of said dome adopting the shape of a substantially planar non-equilateral octagon having a longest side, with the plane of the apex being generally parallel to the base of the device, said apex having a plane of symmetry perpendicular to the plane of said apex, the plane bisecting the longest side and an opposing side of the octagon, a metal petal extending from each of the non-longest sides of the octagon, each petal shaped substantially as an isosceles trapezoid with the shorter of its parallel sides adjoining one of the non-longest sides of the dome's apex octagon, each trapezoid's longer parallel side being attached to an inside edge of said base, the attachment defining an acute angle between a plane of the base and each petal, such that each petal, so attached, forms a sidewall of the irradiation chamber.

* * * * *